US006716541B2

(12) United States Patent
Adler et al.

(10) Patent No.: US 6,716,541 B2
(45) Date of Patent: Apr. 6, 2004

(54) MATERIAL FOR A METAL STRIP

(75) Inventors: Udo Adler, Eschweiler (DE); Jürgen Gebhardt, Osnabrück (DE); Heinz Klenen, Bissendorf (DE); Robert Leffers, Mönchengladbach (DE); Thomas Helmenkamp, Osnabrück (DE)

(73) Assignee: Stolberger Metallwerke GmbH & Co. KG, Stolberg (DE)

( * ) Notice: Subject to any disclaimer, the term of this patent is extended or adjusted under 35 U.S.C. 154(b) by 0 days.

(21) Appl. No.: 10/224,739

(22) Filed: Aug. 19, 2002

(65) Prior Publication Data

US 2003/0044635 A1 Mar. 6, 2003

(30) Foreign Application Priority Data

Aug. 21, 2001 (DE) ........................................ 101 39 953

(51) Int. Cl.[7] ........................... B32B 15/20; C22C 9/02

(52) U.S. Cl. ....................... 428/647; 148/411; 148/412; 148/413; 148/414; 148/432; 148/433; 148/434; 148/435; 420/470; 420/473; 420/476; 420/477; 420/481; 420/482; 420/483; 420/485; 420/487; 420/489; 420/490; 420/492; 420/493; 420/494; 420/497; 428/615; 428/674; 428/929

(58) Field of Search ................................ 428/647, 615, 428/674, 929; 148/411, 412, 413, 414, 432, 433, 434, 435; 420/470, 473, 476, 477, 481, 482, 483, 485, 487, 489, 490, 492, 493, 494, 497

(56) References Cited

U.S. PATENT DOCUMENTS 6,093,499 A * 7/2000 Tomioka ..................... 148/434
6,099,663 A * 8/2000 Bhargava .................... 148/434

FOREIGN PATENT DOCUMENTS

DE 36 28 783 10/1987
DE 43 38 769 4/1996
EP 0 443 291 8/1991

* cited by examiner

*Primary Examiner*—Robert R. Koehler
(74) *Attorney, Agent, or Firm*—Kenyon & Kenyon

(57) ABSTRACT

The material for a metal strip for manufacturing electrical contact component parts has, expressed in percent by weight, the following composition:

| | |
|---|---|
| nickel (Ni) | 0.5–3.5% |
| silicon (Si) | 0.08–1.0% |
| tin (Sn) | 0.1–1.0% |
| zinc (Zn) | 0.1–1.0% |
| zirconium (Zr) | 0.005–0.2% |
| silver (Ag) | 0.02–0.5% |

The remainder is copper and includes impurities caused by smelting.

17 Claims, No Drawings

MATERIAL FOR A METAL STRIP

This application claims priority to the German Application No. 10139953.7 filed Aug. 21, 2001 in Federal Republic Germany.

BACKGROUND OF THE INVENTION

1. Field of the Invention

The invention relates to a material for a metal strip for manufacturing electrical contact components.

2. Description of Related Art

Plug contact connections are widely used in electrotechnical applications. By this is understood, basically, a mechanical device made of a plug and a plug sleeve for opening and closing an electrically conducting connection. Plug contact connections are used in the most varied application fields, as, for example, in the automotive electrical field, messaging technology or the electronics of industrial plants.

A usual manufacturing method of such plug contact elements is to stamp out blanks from a copper or copper alloy strip, and to process these further into plug contact elements. Copper has a high electrical conductivity. To protect against corrosion and wear, as well as for increasing surface hardness, the copper or copper alloy strips are first tinned. Because of its good resistance to corrosion, tin is particularly suitable as a coating material for copper. The application of the coating by hot dipping is a standard technical procedure.

In this context, the most widely different tin alloys are known for surface coating the base material, in particular also tin-silver alloys, since these count among the very good contact materials.

It is known from European patent document 0 443 291 B1 that one may coat the base material of one plug element of a plug connector pair with pure tin or a tin-lead alloy, while the other plug element has a harder surface coating, applied in a molten fashion, made of an alloy containing up to 10% by weight of silver. Aside from silver, a number of other alloying metals is proposed. This approach points in the direction of producing qualitatively high-grade plug connectors having durably low contact resistance and requiring plugging and unplugging forces that are as low as possible.

DE 36 28 783 C2 describes an electrical connecting piece made of a copper alloy having 0.3 to 2% by weight of magnesium as well as 0,001 to 0.1% by weight of phosphorus. The electrical connecting pieces are distinguished by their strength, their electrical conductivity and voltage relaxation properties at raised temperatures. They demonstrate satisfactory application properties, even when made in compact sizes and complicated shapes.

On account of DE 43 38 769 A1, a copper alloy for producing electrical plug contacts also counts among the related art, which has a composition of essentially 0.5 to 3% by weight of nickel, 0.1 to 0.9% [by weight] of tin, 0.08 to 0.8% by weight of silicon, 0.1 to 3% by weight of zinc, 0.007 to 0.25% by weight of iron, 0.001 to 0.2% by weight of phosphorus, as well as 0.001 to 0.2% magnesium, the main component of the rest being copper and including unavoidable impurities.

The known metal strips, or rather the plug contacts made from them have proven themselves in practice. However, technical and qualitative requirements on the contact components, with respect to mechanical and electrical properties are rising increasingly. This applies particularly to the use of contact components under difficult or aggressive environmental conditions, such as for plug contacts in automotive electrical systems, and here above all in motor electronics. Under such difficult application conditions, requirements, above all with respect to temperature stability, relaxation stability, resistance to corrosion and adhesive strength of the coating may appear, with respect to which the known contact components come right up to their limitations. This may lead to peeling of the surface coating.

SUMMARY OF THE INVENTION

It is an object of the invention to create in an economically advantageous manner a material for a metal strip, for manufacturing electrical contact component parts, which combines good electrical and mechanical properties with improved adhesion between the base material and the coating.

These and other objects of the invention are attained by a material for a metal strip for manufacturing electrical contact component parts, which, expressed in percent by weight, has the following composition:

| | |
|---|---|
| nickel (Ni) | 0.5–3.5% |
| silicon (Si) | 0.08–1.0% |
| tin (Sn) | 0.1–1.0% |
| zinc (Zn) | 0.1–1.0% |
| zirconium (Zr) | 0.005–0.2% |
| silver (Ag) | 0.02–0.5% |

The remainder is copper and includes impurities caused by smelting.

DETAILED DESCRIPTION OF THE INVENTION

The metal strip material of the invention is made of a copper alloy having a nickel proportion between 0.5 and 3.5% by weight, a silicon proportion of 0.08 to 1.0% by weight, a tin proportion of 0.1 to 1.0% by weight, a zinc proportion of 0.1 to 1.0% by weight, a zirconium proportion between 0.005 to 0.2% by weight and a silver proportion between 0.02 to 0.5% by weight.

It is true that the material's conductivity goes down on account of its tin proportion, but strength and toughness are increased thereby. The reduction in conductivity is compensated for by adding silver to the alloy. The main purpose of the silver proportion is to participate in diffusion processes with the coating material of a metal strip, as matrix component, under the influence of temperature, and to influence the diffusion-controlled phase formation of intermetallic compounds that is to be expected. Therefore the silver proportion lies between 0.02% by weight and 0.5% by weight. Zirconium with a proportion between 0.005 and 0.2% by weight raises the corrosion resistance and the temperature stability, and improves the hotworking capability.

The material preferably has a silver content of less than 0.15% by weight.

A manganese proportion of less than 0.5% by weight aids temperature stability.

A proportion of magnesium of less than 0.2% by weight improves strength and voltage relaxation properties at elevated temperature of the alloy, along with only slight impairment of the electrical conductivity, which is based on the main component, copper. Magnesium dissolves in the copper matrix.

If indium is added in quantities between 0.1% by weight and 5% by weight, it is true that the melting point is lowered, but all-in-all, stability to outside conditions is improved. In addition, soldering properties are influenced positively.

If there is a tin and zinc content in the material, in a ratio of 1:1, the conductivity loss is reduced and the coating capability is increased. Furthermore, a maximum increase in hardness at good expansion is achieved in the hardened state.

The ratio of tin to silver of approximately 1:4 leads to advantages in the recycling of metal strip coated with tin.

It is also advantageous if the ratio of silver to zinc is greater than 0.1.

A further advantageous property is achieved if the ratio of magnesium plus zirconium to tin is greater than 0.01.

The peeling behavior of the material is clearly improved if the ratio (nickel+silicon) to (tin+zinc+silver+magnesium) is greater than 1.5 but less than 4.

A metal strip of the material in accordance with the invention is distinguished first of all, by its good electrical and mechanical properties, especially by its good conductivity and relaxation stability at good reshapability as well as peeling resistance of the coating. A stable contact resistance is ensured. The metal strip has a high temperature stability at low contact resistance. It is resistant to abrasion and fraying at greater hardness, yet it is easy to form and solder. Plugging and unplugging forces are low at improved resistance to fretting corrosion. Another embodiment of the invention includes a coated, electrically conductive metal strip for manufacturing electrical contact component parts, especially parts of plug contacts which may be used in the higher temperature ranges of motor vehicle construction. The metal strip can be coated with a tin-silver alloy.

In addition, the metal strip is economically advantageous since copper scrap having a tin proportion may be used for its production. In the recycling, a uniform tin balance is obtained. This ensures a constant quality of metal strip produced with the use of scrap. By balancing the use of bright scrap (CuNiSi material), tinned scrap and virgin metal (copper) a base material may be obtained as the casting product, depending on the thickness of the tin coating of the tinned scrap, having a tin content of 0.02 to 1% by weight. Casting products are advantageous for the present method, which have a tin content between 0.25 and 0.5% by weight.

The intermetallic phase between the base material and the coating is fine-grained and uniform. This results in good formability, especially flexibility, higher shearing resistance and low modulus of elasticity as well as high resistance to creep.

Alloy components zinc and silver influence the diffusion behavior in the intermetallic phase between the base material and the coating of tin-silver. The copper-tin phases coming about automatically by diffusion of copper into the tin layer are influenced in their development over temperature and time by way of slowing down and obstruction in the formation of especially the so-called epsilon phase. This guarantees substantially better adhesion of base material and coating. This has the effect of shifting detachment phenomena, particularly peeling of the coating, even in unfavorable and difficult application conditions of the metal strip, or rather, the plug connectors made from it, to higher temperatures and longer elapsed times.

An essential reason for possible aging-related failure of the coating, especially at temperatures above 150° C., is a disproportionally rapid change of the so-called $\eta$-phase ($Cu_6Sn_5$) to the $\epsilon$-phase ($Cu_3Sn$) when it is first formed, starting from the phase boundary between base material and coating, because of great diffusion speed. Now, the present invention makes use of the idea that the presence of the $\epsilon$-phase by itself does not necessarily lead to a detaching process at the boundary between base material and coating, not even in the stress condition of a plug connection, brought about by the forming process. If the development of the $\epsilon$-phase is prevented or hindered, this has a positive effect on the intermetallic phase and the long-term stability of the coating.

Zinc and silver, as well as nickel present in the material, when present in the proportions provided by the present invention, are suitable, during the diffusion process and their participation in the formation of the intermetallic phase, especially by enrichment in the phase boundary, for suppressing or substantially slowing down the rapid change of the $\eta$-phase into the $\epsilon$-phase, with the result of producing a homogeneous, highly adhesive composite of base material and coating.

What is claimed is:

1. A material for a metal strip for manufacturing electrical contact component parts comprising in percent by weight:

| | |
|---|---|
| nickel (Ni) | 0.5–3.5% |
| silicon (Si) | 0.08–1.0% |
| tin (Sn) | 0.1–1.0% |
| zinc (Zn) | 0.1–1.0% |
| zirconium (Zr) | 0.005–0.2% |
| silver (Ag) | 0.02–0.5% |

and a balance of copper; wherein tin and zinc are present in a ratio of approximately 1:1 and tin and silver are present in a ratio of approximately 1:4.

2. The material according to claim 1, containing silver (Ag) in a proportion of less than 0.15%.

3. The material according to claim 1, containing manganese (Mn) in a proportion of less than 0.5%.

4. The material according to claim 2, containing manganese (Mn) in a proportion of less than 0.5%.

5. The material according to claim 1, containing magnesium (Mg) in a proportion of less than 0.2%.

6. The material according to claim 2, containing magnesium (Mg) in a proportion of less than 0.2%.

7. The material according to claim 3, containing magnesium (Mg) in a proportion of less than 0.2%.

8. The material according to claim 1, containing indium (In) in a proportion of 0.1 through 5%.

9. The material according to claim 2, containing indium (In) in a proportion of 0.1 through 5%.

10. The material according to claim 3, containing indium (In) in a proportion of 0.1 through 5%.

11. The material according to claim 5, containing indium (In) in a proportion of 0.1 through 5%.

12. The material according to claim 1, having a ratio of Ag to Zn greater than 0.1.

13. The material according to claim 1, having a ratio (Mg+Zr) to Sn greater than 0.01.

14. The material according to claim 1, in which the ratio (Ni+Si) to (Sn+Zn+Ag+Mg) is greater than 1.5 but less than 4.

15. A coated, electrically conductive metal strip comprising the material according to claim 1.

16. The according to claim 1 which is coated with a tin-silver alloy.

17. A material for manufacturing component parts consisting essentially of:

| | |
|---|---|
| nickel (Ni) | 0.5–3.5% |
| silicon (Si) | 0.08–1.0% |
| tin (Sn) | 0.1–1.0% |
| zinc (Zn) | 0.1–1.0% |
| zirconium (Zr) | 0.005–0.2% |
| silver (Ag) | 0.02–0.5% |

and a balance of copper; wherein tin and zinc are present in a ratio of approximately 1:1, tin and silver are present in a ratio of approximately 1:4; and a ratio of a combination of nickel and silicon to a combination of tin, zinc, silver and magnesium is about 1.5 to 4 and the ratio of Magnesium plus zirconium to tin is greater than 0.01.

* * * * *

UNITED STATES PATENT AND TRADEMARK OFFICE

CERTIFICATE OF CORRECTION

PATENT NO. : 6,716,541 B2
DATED : April 6, 2004
INVENTOR(S) : Adler et al.

It is certified that error appears in the above-identified patent and that said Letters Patent is hereby corrected as shown below:

Column 4,
Line 64, change "(The According)" to -- (The material According) --.

Signed and Sealed this

Second Day of November, 2004

JON W. DUDAS
*Director of the United States Patent and Trademark Office*